(12) United States Patent
Ikeda et al.

(10) Patent No.: US 11,381,687 B2
(45) Date of Patent: Jul. 5, 2022

(54) INFORMATION PROCESSING APPARATUS AND CONTROL METHOD THEREFOR

(71) Applicant: CANON KABUSHIKI KAISHA, Tokyo (JP)

(72) Inventors: Satoru Ikeda, Kashiwa (JP); Yuya Hasegawa, Abiko (JP); Makoto Arima, Abiko (JP); Yoshikazu Sato, Nagareyama (JP); Kazuhiro Oyoshi, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/818,237

(22) Filed: Mar. 13, 2020

(65) Prior Publication Data

US 2020/0314249 A1    Oct. 1, 2020

(30) Foreign Application Priority Data

Mar. 25, 2019  (JP) .............................. JP2019-056272

(51) Int. Cl.
*H04N 1/00*      (2006.01)
*G06F 3/14*       (2006.01)

(52) U.S. Cl.
CPC ....... *H04N 1/0001* (2013.01); *H04N 1/00037* (2013.01); *H04N 1/00076* (2013.01)

(58) Field of Classification Search
None
See application file for complete search history.

(56) References Cited

U.S. PATENT DOCUMENTS

| | | | | |
|---|---|---|---|---|
| 5,432,907 A | * | 7/1995 | Picazo, Jr | H04L 12/44 370/401 |
| 5,519,832 A | | 5/1996 | Warchol | |
| 5,588,144 A | * | 12/1996 | Inoue | G06F 3/0601 713/500 |
| 6,061,391 A | * | 5/2000 | Sasaki | H04L 1/243 370/249 |
| 6,157,956 A | * | 12/2000 | Jensen | G06F 11/3068 709/246 |
| 2007/0262977 A1 | * | 11/2007 | Liu | G09G 5/00 345/211 |
| 2008/0030362 A1 | | 2/2008 | Huang | |
| 2009/0300640 A1 | * | 12/2009 | Akitomi | G06F 9/5077 718/104 |
| 2010/0062805 A1 | | 3/2010 | Moran et al. | |
| 2010/0095145 A1 | * | 4/2010 | Chan | G06F 1/3243 713/324 |
| 2011/0131437 A1 | | 6/2011 | Shimazaki | |
| 2012/0290884 A1 | | 11/2012 | Hamaguchi | |
| 2016/0133112 A1 | | 5/2016 | Kawamoto | |
| 2016/0316072 A1 | | 10/2016 | Mori | |
| 2017/0123954 A1 | * | 5/2017 | Shih | G06F 11/3034 |

(Continued)

FOREIGN PATENT DOCUMENTS

JP  2015-108593 A    6/2015
WO  WO 2017152977  *  9/2017 ............. G06F 21/57

*Primary Examiner* — Beniyam Menberu
(74) *Attorney, Agent, or Firm* — Canon U.S.A., Inc. IP Division (57) ABSTRACT

A LAN controller performs lighting control upon LEDs, which are configured to be subjected to lighting control by the LAN controller, on the basis of the start-up status of an apparatus after communicating with an external apparatus.

24 Claims, 5 Drawing Sheets

(56) References Cited

U.S. PATENT DOCUMENTS

2020/0314249 A1   10/2020  Ikeda et al.
2020/0314255 A1*  10/2020  Arima ................ H04N 1/00076
2020/0314256 A1*  10/2020  Hasegawa ............ H05B 47/175

* cited by examiner

INFORMATION PROCESSING APPARATUS AND CONTROL METHOD THEREFOR

BACKGROUND

Field

The present disclosure relates to a technique for controlling the turning on and off of a light-emitting unit.

Description of the Related Art

Information processing apparatuses, such as personal computers and copiers have notified users or service persons of abnormalities thereof. Upon receiving such a notification, a user can perform appropriate recovery processing for an apparatus or a service person can specify a component needed to repair an apparatus.

Japanese Patent Laid-Open No. 2015-108593 discloses a system for making a notification about a system voltage abnormality by causing a voltage monitoring circuit for monitoring the rise of each system voltage generated by a power source circuit to turn on and off an LED whose turning on and off are controlled by an LAN controller. However, in the system disclosed in Japanese Patent Laid-Open No. 2015-108593, the voltage monitoring circuit, which performs lighting control of the LED, does not perform lighting control of the LED after the LAN controller has communicated with an external apparatus.

SUMMARY

The present disclosure provides an information processing apparatus including a light-emitting unit, a communication unit configured to communicate with an external apparatus and turn on and off the light-emitting unit based on a status of communication with the external apparatus, and a control unit configured to turn on and off the light-emitting unit based on a start-up status of the information processing apparatus. The control unit turns on and off the light-emitting unit based on the start-up status after the communication unit has communicated with the external apparatus.

Further features of the present disclosure will become apparent from the following description of exemplary embodiments with reference to the attached drawings.

DESCRIPTION OF THE EMBODIMENTS

Embodiments of the present disclosure will be described below with reference to the accompanying drawings.

Configurations to be described in the following embodiments are illustrative only, and the present disclosure is not limited to these illustrated configurations.

First Embodiment

Figure 1:
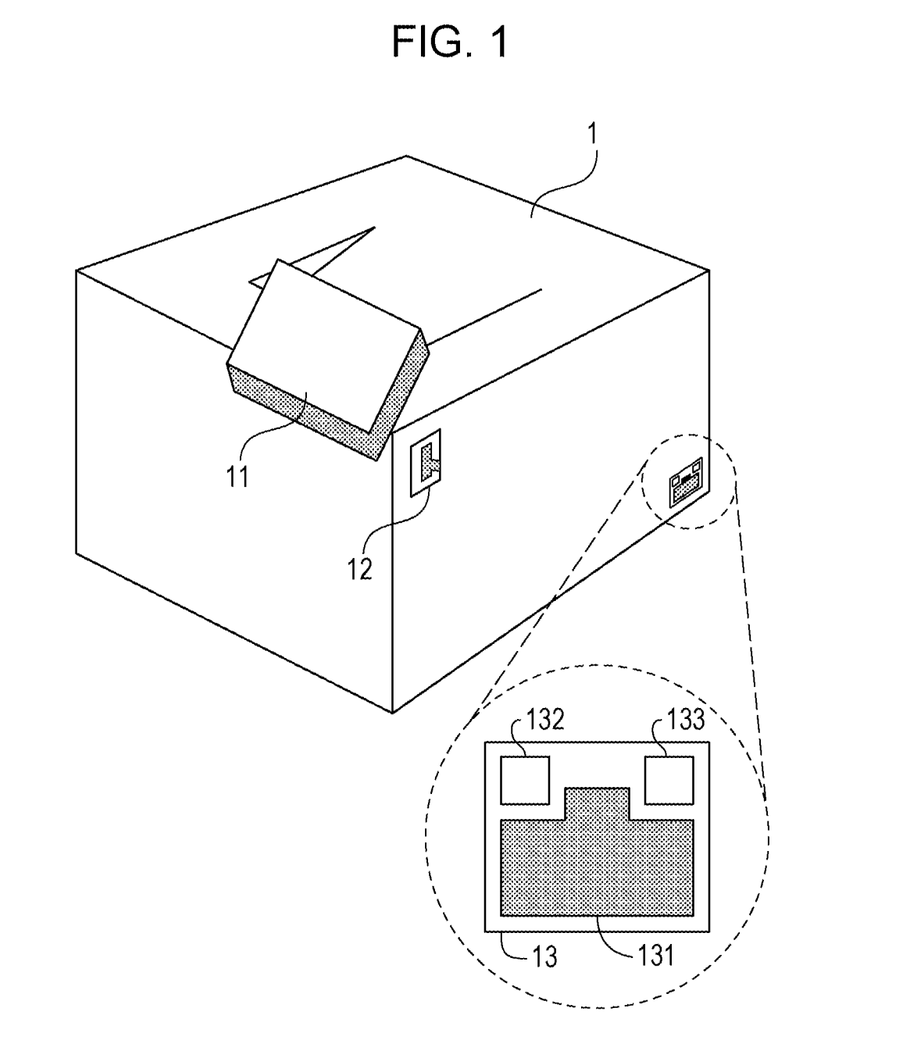
FIG. 1 is a schematic diagram of an entire information processing apparatus.

FIG. 1 is a schematic diagram of an entire information processing apparatus according to this embodiment.

An information processing apparatus 1 includes a display unit 11, a power switch 12, and a LAN connector 13. The information processing apparatus 1 according to this embodiment may be a printer having a printing function or a reader having a document reading function and is not limited to a specific type of apparatus. If the information processing apparatus 1 is a printer having a printing function, the information processing apparatus 1 includes a printer engine for printing an image corresponding to printing data received from an external network by a LAN controller 206 to be described below. If the information processing apparatus 1 is a reader having a document reading function, the information processing apparatus 1 includes a scanner for reading a document and transmits the image of a document read by the scanner to an external network using the LAN controller 206.

The display unit 11 has a function of displaying, for example, graphic data that the information processing apparatus 1 has. The display unit 11 may have another function of allowing a user to select an object displayed by the information processing apparatus 1, such as a touch panel or a button.

The power switch 12 controls the power supply status of the information processing apparatus 1. When the power switch 12 is in a conduction state (ON state), a power source is supplied to the information processing apparatus 1. When the power switch 12 is in an insulation state (OFF state), a power source is not supplied to the information processing apparatus 1.

The LAN connector 13 to which a LAN cable (communication cable) is connected is used for communication with an apparatus outside the information processing apparatus 1. The LAN connector 13 includes a LAN cable connection unit 131 and LEDs 132 and 133 used to make a notification about a current communication state when a LAN cable is connected thereto. One end of a LAN cable is connected to the LAN cable connection unit 131 and the other end of the LAN cable is connected to an external apparatus (e.g., a hub). The information processing apparatus 1 includes the LAN controller 206 to be described below. The LAN controller 206 transmits/receives data to/from an external apparatus via a LAN cable. That is, a LAN cable transmits data between two apparatuses.

Figure 2:
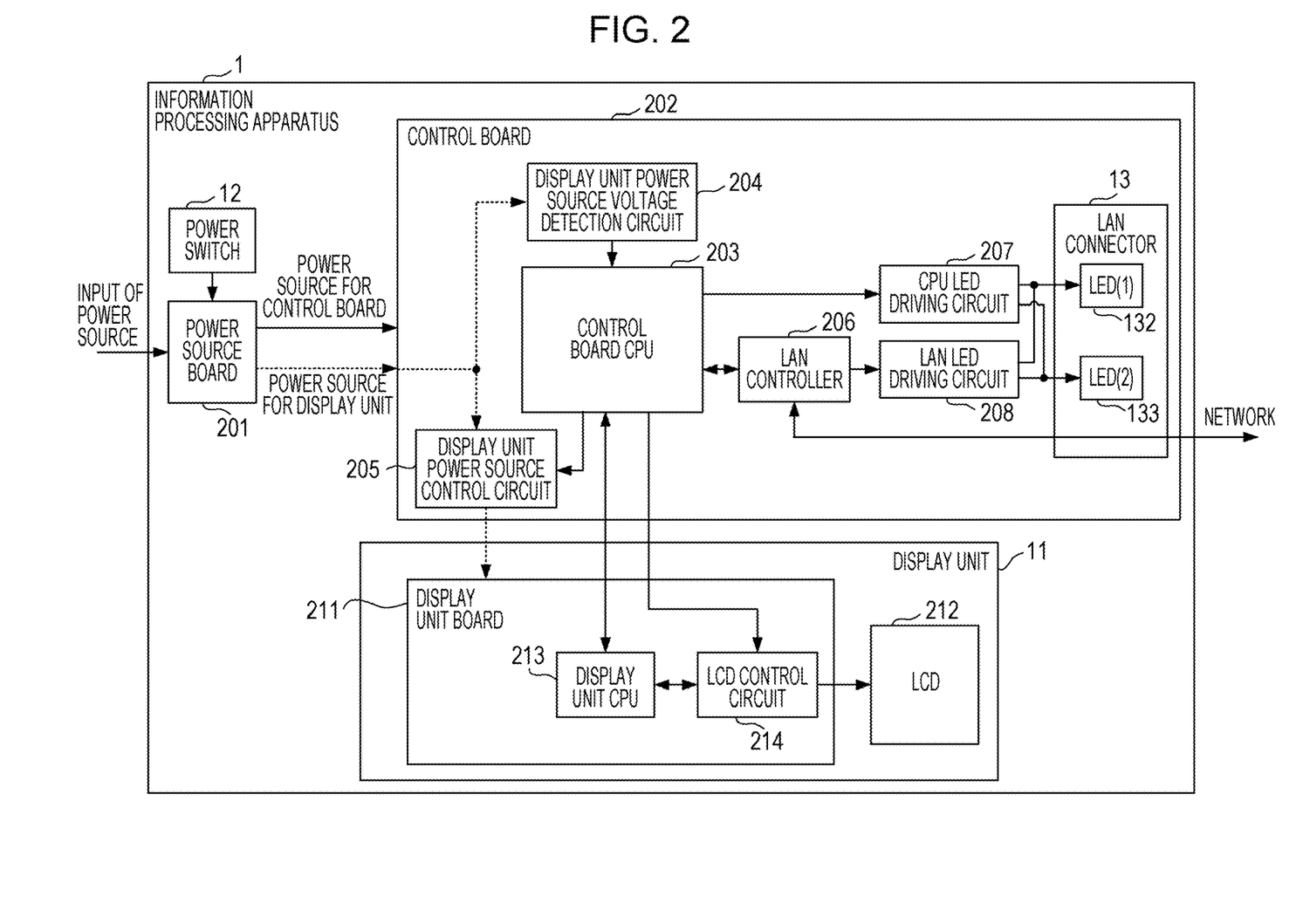
FIG. 2 is a block diagram illustrating an exemplary hardware configuration of an information processing apparatus.

FIG. 2 is a block diagram illustrating an exemplary hardware configuration of the information processing apparatus 1. The information processing apparatus 1 includes a power source board 201 and a control board 202 in addition to the display unit 11, the power switch 12, and the LAN connector 13.

The power source board 201 is connected to an external power source (for example, AC 100 V), the power switch 12, and the control board 202. When the power switch 12 is brought into the ON state, the power source board 201 generates a power source voltage (for example, DC 5 V) necessary for the operation of the control board 202 and a power source voltage (for example, DC 24 V) necessary for the operation of the display unit 11 and supplies them to the control board 202. That is, the power source board 201 functions as a unit for supplying power of different voltages to the control board 202 and the display unit 11. The power source board 201 supplies power of different voltages to respective portions in a predetermined order. For example, the power source board 201 starts to supply power of DC 5 V to the control board 202 and then starts to supply power of DC 24 V to the display unit 11.

The control board 202 has a function of communicating with an external apparatus using the LAN connector 13 and a function of generating image data to be displayed on the display unit 11, transmitting the image data to the display unit 11, and controlling the supply of power to the display unit 11. The control board 202 includes a control board CPU 203 (hereinafter referred to as CPU 203), a display unit power source voltage detection circuit 204, a display unit power source control circuit 205, a LAN controller 206, a CPU LED driving circuit 207, a LAN LED driving circuit 208, and the LAN connector 13.

The control board CPU 203 is a central processing unit for performing overall control of the information processing apparatus 1. The control board CPU 203 is connected to the display unit power source voltage detection circuit 204, the display unit power source control circuit 205, the LAN controller 206, the CPU LED driving circuit 207, a display unit CPU 213, and an LCD control circuit 214 to be described below.

The display unit power source voltage detection circuit 204 detects whether a power source voltage necessary for the operation of the display unit 11 is supplied from the power source board 201 and notifies the control board CPU 203 of a detection result.

The display unit power source control circuit 205 controls whether to supply a power source that the power source board 201 generates for the display unit 11 to the display unit 11 on the basis of a signal received from the control board CPU 203. The display unit power source control circuit 205 is formed of, for example, a circuit using an FET.

The LAN controller 206 is an integrated circuit having a PHY function of performing network communication with an external apparatus via the LAN connector 13. The control board CPU 203 performs network communication control by performing, for example, the setting of a register included in the LAN controller 206 in communication compliant with the management data interface (MDI) system.

The LAN controller 206 performs communication compliant with the media independent interface (MII) system with a MAC included in the control board CPU 203 and performs network communication with an external apparatus via the LAN connector 13 depending on the contents of the communication.

The LAN controller 206 performs lighting control of the LEDs 132 and 133 using the LAN LED driving circuit 208 to be described below to make a notification about the state of network communication with an external apparatus using the LEDs 132 and 133 on the basis of the setting of a register. The state of network communication includes, for example, the state of a link between the LAN controller 206 and an external apparatus, a link speed, and operating conditions such as data being under transmission/reception.

The LAN controller 206 is an integrated circuit having a PHY function in this embodiment, but may be an integrated circuit having PHY and MAC functions (a MAC is not included in the control board CPU 203 in this case).

Alternatively, a configuration in which the control board CPU 203 has both MAC and PHY functions may be employed (the LAN controller 206 is included in the control board CPU 203 in this case).

The CPU LED driving circuit 207 is a circuit for turning on or off the LEDs 132 and 133 in accordance with a LED control signal received from the control board CPU 203.

In order to separately control turning on or off of the LEDs 132 and 133, the LED control signal includes two signals, a control signal for the LED 132 and a control signal for the LED 133.

The above-described LED control signal is configured such that a power source is supplied to the control board 202 and while the control board CPU 203 does not transmit a control signal to the CPU LED driving circuit 207, the LED 132 is turned on and the LED 133 is turned off. A concrete exemplary configuration will be described below with reference to FIG. 3.

The LAN LED driving circuit 208 turns on or off the LEDs 132 and 133 in response to the control signal for the LED 132 and the control signal for the LED 133 received from the LAN controller 206.

The display unit 11 includes a display unit board 211 and a liquid crystal display (hereinafter referred to as LCD) 212. The display unit 11 is used to notify a user or a service person of information about an abnormal point by displaying an image on the LCD 212.

The display unit board 211 has a function of converting a power source supplied from the control board 202 and image data received from the control board CPU 203 into a drawing signal with which the LCD 212 can perform drawing and transmitting the drawing signal to the LCD 212. The display unit board 211 includes the display unit CPU 213 and the LCD control circuit 214. The display unit CPU 213 performs the setting thereof and the setting of the LCD control circuit 214 to be described below in accordance with a command received from the control board CPU 203 and transmits the state of the display unit board 211 to the control board CPU 203 as a command. The LCD control circuit 214 converts image data received from the control board CPU 203 into a drawing signal with which the LCD 212 can perform drawing. The display unit CPU 213 controls the LCD control circuit 214 to display an image on the LCD 212.

The LCD 212 displays an image on the basis of a drawing signal received from the display unit board 211.

Figure 3:
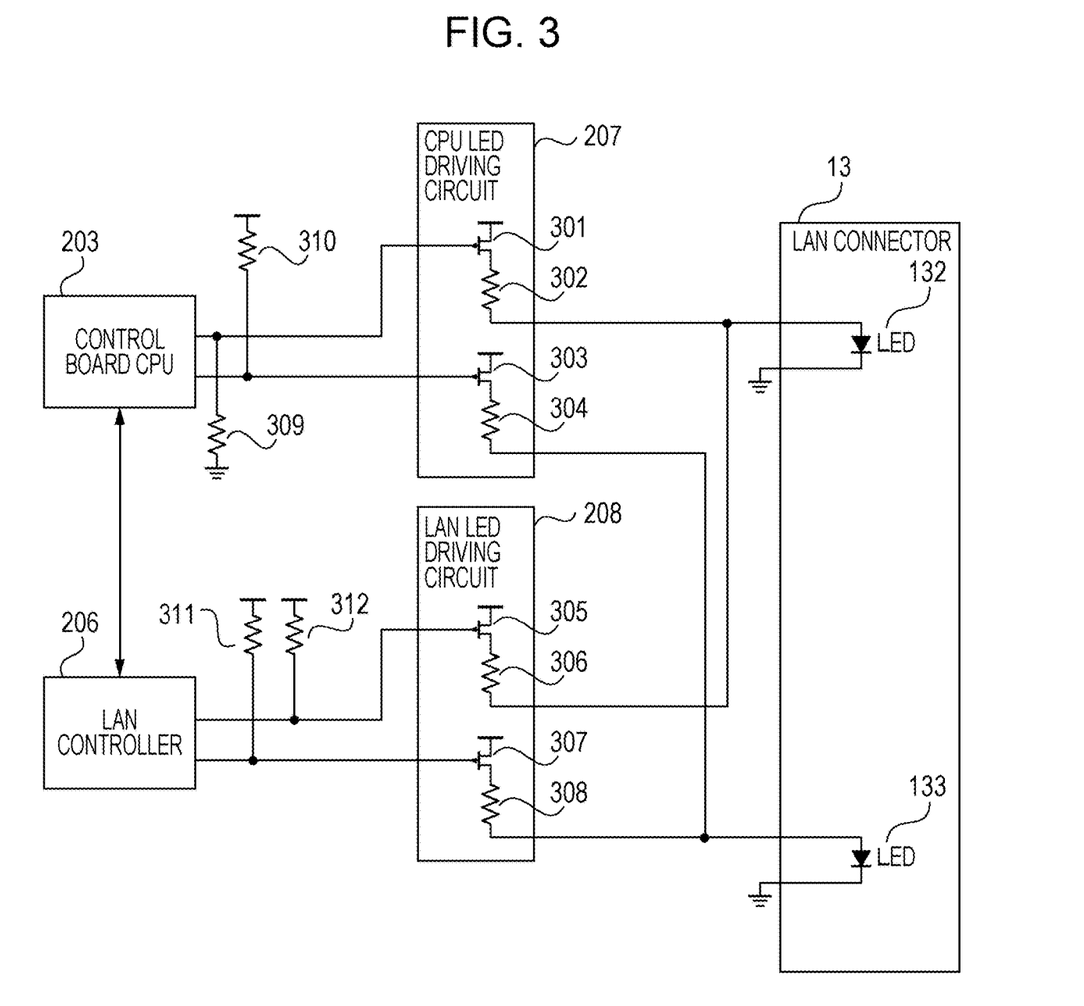
FIG. 3 is a diagram illustrating the electric circuit configurations of a CPU driving circuit and an LAN LED driving circuit.

FIG. 3 is an exemplary schematic diagram illustrating an electric circuit including the CPU LED driving circuit 207 and the LAN LED driving circuit 208 illustrated in FIG. 2.

An LED control signal that the control board CPU 203 uses to control the lighting (turning on and off) of the LED 132 is connected (input) to the gate terminal of a p-channel FET 301 in the CPU LED driving circuit 207.

An LED control signal that the control board CPU 203 uses to control the lighting (turning on and off) of the LED 133 is connected (input) to the gate terminal of a p-channel FET 303 in the CPU LED driving circuit 207.

An LED control signal that the LAN controller 206 uses to control the lighting (turning on and off) of the LED 132 is connected (input) to the gate terminal of a p-channel FET 305 in the LAN LED driving circuit 208.

An LED control signal that the LAN controller 206 uses to control the lighting (turning on and off) of the LED 133 is connected (input) to the gate terminal of a p-channel FET 307 in the LAN LED driving circuit 208.

When the potential of a control signal connected to the gate terminal of each of the p-channel FETs 301, 303, 305, and 307 is close to a GND voltage (hereinafter referred to as a "Low level"), a current flows through the LED 132 or 133 and the LED 132 or 133 is turned on.

In contrast, when the potential of a control signal connected to the gate terminal of each of the p-channel FETs 301, 303, 305, and 307 is close to a power source voltage (hereinafter referred to as a "Hi level"), a current does not flow through the LED 132 or 133 and the LED 132 or 133 is turned off.

Resistors 302, 304, 306, and 308 are used to control the amount of current flowing through the LED 132 or 133.

The resistance values of the resistors 302, 304, 306, and 308 are determined to satisfy the value of a current determined on the basis of the amount of light necessary at the time of lighting of the LEDs 132 and 133.

The LEDs 132 and 133 are semiconductors having different light emission colors. The amounts of light of the LEDs 132 and 133 when the current of the same value flows therethrough are different and forward voltages applied thereto are also different. Accordingly, in order to cause the LEDs 132 and 133 to emit substantially the same amount of light, the resistance of the resistors 302 and 306 and the resistance of the resistors 304 and 308 need to be set to different values. For example, the resistance value of the resistors 302 and 306 is 510Ω and the LED 132 emits light while flowing the current of approximately 3.5 mA. The resistance value of the resistors 304 and 308 is 470Ω and the LED 133 emits light while flowing the current of approximately 3.9 mA.

Although the p-channel FETs are used as switches for the lighting control of the LEDs 132 and 133 in this embodiment, a switch may be formed of one or a plurality of transistors or semiconductor ICs.

Although the values of currents flowing through the LED 132 and 133 are limited by the resistors 302, 304, 306, and 308 in this embodiment, a current-limiting circuit formed of, for example, a semiconductor may be used.

When one of the CPU LED driving circuit 207 and the LAN LED driving circuit 208 to both of which the LED 132 is connected performs turning-on control, the LED 132 is turned on. When both the CPU LED driving circuit 207 and the LAN LED driving circuit 208 perform turning-off control, the LED 132 is turned off.

Similarly, when one of the CPU LED driving circuit 207 and the LAN LED driving circuit 208 to both of which the LED 133 is connected performs turning-on control, the LED 133 is turned on. When both the CPU LED driving circuit 207 and the LAN LED driving circuit 208 perform turning-off control, the LED 133 is turned off.

For the two control signals transmitted from the control board CPU 203 to the CPU LED driving circuit 207, a resistor 309, which is used to specify the initial state of a signal at the time of the supply of a power source, is connected to a ground GND and resistors 310, 311, and 312 are connected to respective power sources. That is, the resistor 309 is a pull-down resistor and the resistors 310, 311, and 312 are pull-up resistors.

When a power source is supplied to the control board 202 and neither of the control board CPU 203 and the LAN controller 206 transmits a control signal to the CPU LED driving circuit 207 and the LAN LED driving circuit 208, the terminals of the control board CPU 203 and the LAN controller 206 are brought into a high-impedance state. Accordingly, the gate terminal of the p-channel FET 301 is brought into the Low level by the resistor 309 and the FET 301 is turned on. The LED 132 is therefore turned on.

When a power source is supplied to the control board 202 and neither of the control board CPU 203 and the LAN controller 206 transmits a control signal to the CPU LED driving circuits 207 and the LAN LED driving circuit 208, the terminals of the control board. CPU 203 and the LAN controller 206 are brought into a high-impedance state. Accordingly, the gate terminal of the FET 303 is brought into the Hi level by the resistor 310, the FET 303 is brought into the OFF state, the gate terminal of the FET 307 is brought into the Hi level by the resistor 311, and the FET 307 is also brought into the OFF state. The LEI) 133 is therefore turned off.

The resistors 309 and 310 are disposed between the control board CPU 203 and the CPU LED driving circuit 207 in this embodiment, but may be disposed in the CPU LED driving circuit 207. Alternatively, they may be disposed in the control board CPU 203 as internal resistors independent of the port control of the control board CPU 203.

Figure 4:
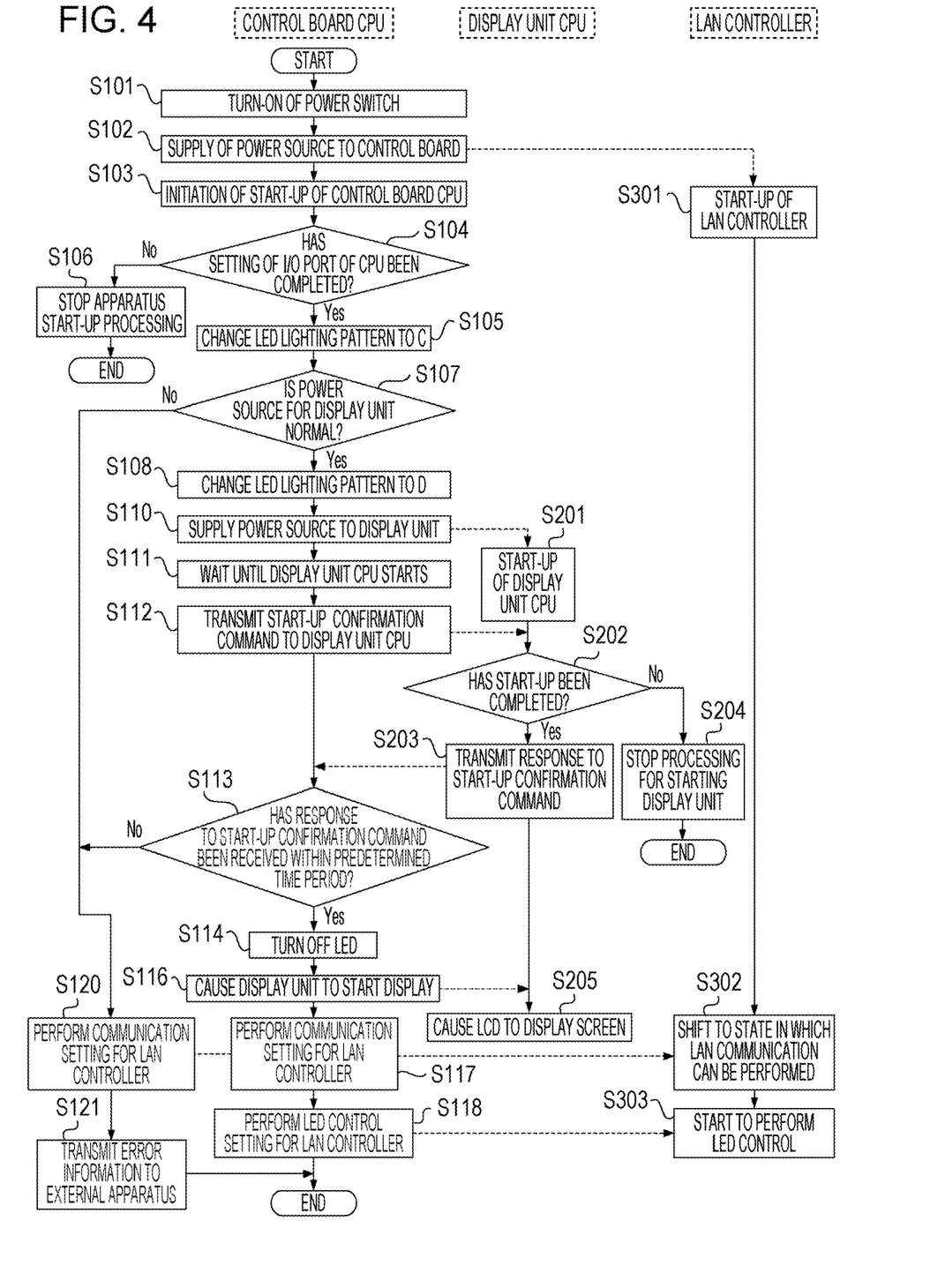
FIG. 4 is a diagram illustrating a control flow of an implementation system.

FIG. 4 is a flowchart illustrating the start-up sequence of the information processing apparatus 1. In this start-up sequence, the control board CPU 203 in the control board 202 executes a program. In this embodiment, this program includes a boot program that the control board CPU 203 executes first after a reset state has been cleared. This boot program causes the control board CPU 203 to perform a series of pieces of processing for starting the information processing apparatus 1. That is, this boot program performs settings to make a plurality of input/output ports of the control board CPU 203 available for use. Furthermore, this boot program starts the display unit CPU 213 to allow the display unit CPU 213 to display, for example, images and characters on the LCD 212. Still furthermore, this boot program performs the setting of the LAN controller 206 to allow the LAN controller 206 to communicate with an external apparatus and control the turning on and off of the LEDs 132 and 133.

One of the features of this embodiment is that this boot program turns on and off the LEDs 132 and 133 depending on the execution status thereof (the progress of a series of pieces of processing) until the display unit CPU 213 is started up and the display unit 11 is ready to display information. The execution status of the boot program is included in the start-up status of the information processing apparatus 1 (the progress of start-up processing).

The control board CPU 203 performs respective pieces of processing in the flow chart illustrated in FIG. 4 in accordance with this boot program.

When the power switch 12 is turned on (S101), the power source board 201 supplies a power source (power of 5 V and 24 V in this embodiment) to the control board 202 (S102).

Figure 5:
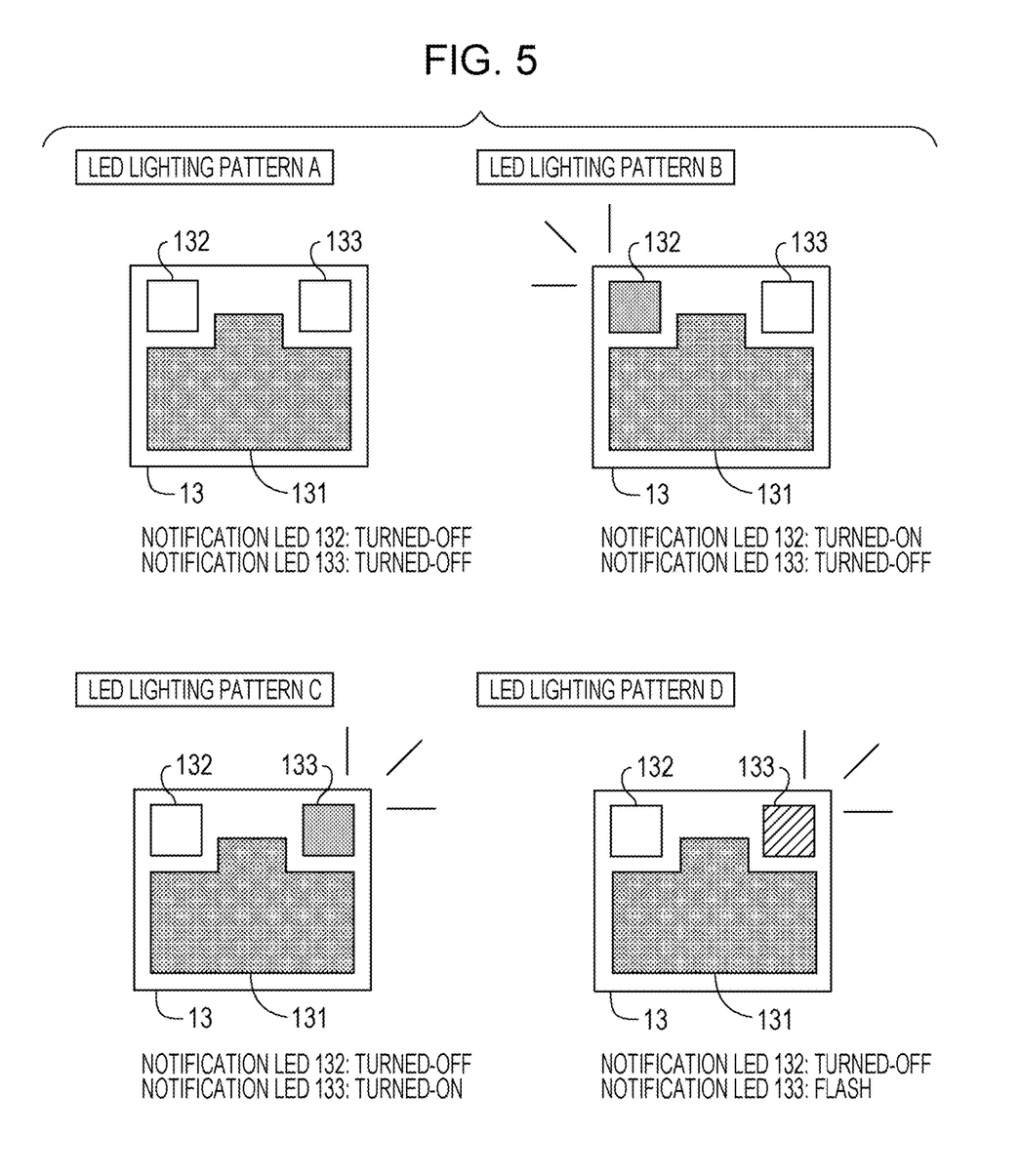
FIG. 5 is a diagram illustrating the lighting patterns of LEDs.

Before the power switch 12 is turned on, both the LEDs 132 ad 133 are in a turned-off state (an LED lighting pattern A illustrated in FIG. 5).

The control board CPU 203 to which a power source (power) is supplying reads a boot program from a nonvolatile memory (not illustrated) and initiates start-up (S103). The boot program has not yet been executed at that time and the LED 132 lights up without being controlled by the control board CPU 203 as described above. That is, the lighting pattern of the LED is an LED lighting pattern B illustrated in FIG. 5.

If the display unit 11 does not perform display processing and both the LEDs 132 and 133 in the LAN connector 13 are in the "turned-off state" even though the power switch 12 has been turned on, the information processing apparatus 1 is considered to be in a state in which a power source is not supplied to the control board 202. Accordingly, when the information processing apparatus stops in a state in which both the LEDs 132 and 133 remain off, it can be determined that an abnormal point is at a power source unit (the power switch 12, the power source board 201, and a bundle of power source lines).

When a power source is supplied to the control board 202, the power source is also supplied to the LAN controller 206 and the LAN controller 206 starts (S301). The LAN controller 206 remains in an initial state until the control board CPU 203 performs the setting of a register in the LAN controller 206 and does not perform LED control and network communication. That is, the LAN controller 206 is set by the control board CPU 203 so that it can perform LED control, and then controls the LEDs 132 and 133, The LAN controller 206 is set by the control board CPU 203 so that it can communicate with an external apparatus, and then can communicate with an external apparatus.

Immediately after the LAN controller 206 has started, the LED control signal terminal of the LAN controller 206 connected to the LAN LED driving circuit 208 is brought into a high-impedance state.

After the control board CPU 203 has completed the reading of the boot program, the control board CPU 203 executes the read boot program. The control board CPU 203 performs the setting of a plurality of external input/output (I/O) ports of the control board CPU 203 (Yes in S104). The control board CPU 203 uses these input/output ports to communicate with a peripheral device. Examples of a peripheral device include the display unit power source voltage detection circuit 204, the display unit power source control circuit 205, the LAN controller 206, the CPU LED driving circuit 207, the display unit CPU 213, and the LCD control circuit 214. In this setting, it is determined whether each of the input/output ports is used as an input port or an output port. For example, the control board CPU 203 sets the input/output port connected to a signal line for an LED control signal for controlling the turning on and off of the LED 132 as an output port. The control board CPU 203 sets the input/output port connected to an LED control signal line for the LED 133 as an output port. The control board CPU 203 sets the input/output port connected to a signal line for a reset control signal for controlling the reset and reset clearing of the LAN controller 206 as an output port. The control board CPU 203 controls the output level of the reset control signal output from this output port to bring the LAN controller 206 into a reset state. The control board CPU 203 also performs the setting of a communication control signal for the LAN controller 206.

After this setting, the control board CPU 203 controls the output level of the LED control signal to change the LEI) lighting pattern from the LED lighting pattern to an LED lighting pattern C illustrated in FIG. 5. In this embodiment, the LED control signal for the LED 132 is brought into the "Hi level" to turn off the LED 132 and the LED control signal for the LED 133 is brought into the "Low level" to turn on the LED 133 (S105).

If the control board CPU 203 cannot perform a start-up processing including the setting of the input/output ports for some reason (for example, a program reading abnormality) (No in S104), the apparatus stops in that state (S106). If the start-up of the information processing apparatus 1 stops, the setting of the input/output ports used for the intercommunication between the control board CPU 203 and the LAN controller 206 is not completed. Accordingly, the pieces of processing of S120 and S121 to be described below are not performed. That is, the LED lighting pattern B illustrated in FIG. 5 remains. If the display unit 11 does not perform display processing, the LED 132 in the LAN connector 13 is in the "turned-on state", and the LED 133 in the LAN connector 13 is in the "turned-off state" (the lighting pattern B) even though the power switch 12 has been turned on, the information processing apparatus 1 is considered to be in a state in which the control board CPU 203 cannot start because of an abnormality on the control board 202 (for example, the failure of the control board CPU 203, the failure of a base board element, or the abnormality of a base board wiring line) even through a power source is supplied to the control board 202. Accordingly, when the apparatus stops while showing the lighting pattern B, it can be determined that an abnormal point is at the control board 202.

Subsequently, the control board CPU 203 determines whether a power source voltage (24 V in an embodiment) to be supplied to the display unit 11 is normal by checking the level of a signal transmitted from the display unit power source voltage detection circuit 204 (S107).

When it is determined that a power source voltage to be supplied to the display unit 11 is normal (Yes in S107), the control board CPU 203 controls the output level of an LED control signal to change the LEI) lighting pattern from the LED lighting pattern C to an LED lighting pattern D illustrated in FIG. 5 (S108). In this embodiment, the control board CPU 203 sets an LED control signal for the LED 132 to the "Hi level" to turn off the LED 132, The control board CPU 203 performs control processing to flash the LED 133 such that the LED control signal for the LED 133 repeatedly switches between the "Hi level" and the "Low level" every second.

On the other hand, when it is determined that a power source voltage to be supplied to the display unit 11 is abnormal (No in S107), the LED lighting pattern C illustrated in FIG. 5 remains. The control board CPU 203 performs the setting of a register in the LAN controller 206 while keeping the LED lighting pattern C to allow the LAN controller 206 to communicate with an external apparatus (S120). This setting is performed via the input/output port that the control board CPU 203 uses to communicate with the LAN controller 206 and a communication line. The LAN controller 206 that has been subjected to the setting shifts to a state in which it can communicate with an external network via the LAN connector 13 (S302). In this case (No in S107), the control board CPU 203 does not perform setting to allow the LAN controller 206 to control the illumination of the LEDs 132 and 133. Accordingly, the LAN controller 206 does not perform the processing of S303 to be described below (LED control). Accordingly, the control board CPU 203 continues to control the LEDs 132 and 133 and the lighting pattern C remains.

Subsequently, the control board CPU 203 generates a data packet including error information (for example, information about an abnormal point) acquired in the case of No in S107 and instructs the LAN controller 206 to transmit the generated data packet to an external apparatus (S121). That is, this data packet is generated on the basis of the start-up status of the information processing apparatus 1 and includes error information regarding the start-up of the information processing apparatus 1. The error information is information about details of an error, the fact that there is an abnormality in a power source voltage to be supplied to the display unit 11. The LAN controller 206 transmits this data packet to an external apparatus (S304).

An external apparatus to which error information is transmitted may be a wired LAN hub or an apparatus connected to the hub. Error information may be transmitted to, for example, a specific URL registered in advance or may be transmitted to a wired LAN in a broadcast or multicast manner. At that time, the control board. CPU 203 controls the LEDs 132 and 133 in the LAN connector 13 via the CPU LED driving circuit 207. The LEDs 132 and 133 therefore do not indicate a communication status and perform display indicating abnormal conditions. If LAN communication does not occur for the reason that there is no connection to a LAN cable in S121, a standby state is set.

If the display unit 11 does not perform display, the LED 132 in the LAN connector 13 in the "turned-off state", and the LED 133 in the LAN connector 13 is in the "turned-on state" even through the power switch 12 has been turned on, the information processing apparatus 1 is considered to be in a state in which a power source for the control board 202 (the control board CPU 203, the LAN controller, and the LAN connector 13) is normally supplied but there is an abnormality at a power source to be supplied to the display unit 11. Accordingly, when the apparatus stops while showing the lighting pattern C, it can be determined that an abnormal point is at a power source supply unit for the display unit 11 (the power source board 201 and a bundle of power source lines). If the start-up of the information processing apparatus 1 is not completed as described above, the LAN controller 206 transmits a data packet representing this fact to an external apparatus and the control board CPU 203 turns on and off the LEDs 132 and 133 after (and also before) the transmission of this data packet. At that time, the control board CPU 203 causes the LAN controller 206 to transmit the data packet without causing the LAN controller 206 to turn on and off the LEDs 132 and 133.

After checking that there is no abnormality at a power source to be supplied to the display unit 11, the control board CPU 203 outputs a control signal for supplying a power source to the display unit 11 to the display unit power source control circuit 205 (S110). After a power source has been supplied to the display unit 11, the display unit CPU 213 starts (S201). Thus, the control board CPU 203 starts the display unit CPU 213.

The control board CPU 203 waits for a enough time (200 ms in this embodiment) for the display unit CPU 213 to complete start-up (S111) and transmits a start-up confirmation command to the display unit CPU 213 (S112).

Upon receiving an initialization command, the display unit CPU 213 determines whether it has normally completed start-up processing. When the display unit CPU 213 has normally completed start-up processing (Yes in S202), the display unit CPU 213 transmits a response to the start-up confirmation command to the control board CPU 203 (S203). The response to the start-up confirmation command corresponds to a signal indicating that the start-up of the display unit CPU 213 has completed.

If the display unit CPU 213 cannot normally start because of, for example, a power source abnormality in the display unit or the failure of the display unit CPU 213, the response to the start-up confirmation command is not transmitted and the start-up of the display unit 11 stops (No in S202).

The control board CPU 203 determines whether it has received the response to the start-up confirmation command from the display unit CPU 213 within a predetermined time period (10 ms in this embodiment) after transmitting the start-up confirmation command to the display unit CPU 213.

When the response to the start-up confirmation command has been received from the display unit CPU 213 within the predetermined time period (Yes in S113), the control board CPU 203 controls the output level of an LED control signal to bring the LEDs 132 and 133 into the turned-off state. That is, the control board CPU 203 sets an LED control signal for the LED 132 to the "Hi level" to turn off the LEI) 132 and sets an LED control signal for the LED 133 to the "Hi level" to turn off the LED 133 (S114).

When a predetermined time period has elapsed without receiving the response to the start-up confirmation command (No in S113), the process proceeds to S120 and S121. As described above, the control board CPU 203 performs the setting of the LAN controller 206 to allow the LAN controller 206 to communicate with an external apparatus in S120, and generates a data packet including error information and causes the LAN controller 206 to transmit the data packet in S121. The error information is information about details of an error, the fact that a response to the start-up confirmation command has not been transmitted from the display unit 11. At that time, the LED lighting pattern D illustrated in FIG. 5 remains. If the display unit 11 does not perform display processing, the LED 132 in the LAN connector 13 is in the "turned-off state", and the LED 133 in the LAN connector 13 is in the "flash state" even though the power switch 12 has been turned on, the information processing apparatus 1 is considered to be in a state in which the control board CPU 203 normally operates and the display unit 11 does not operate even though a power source for the display unit is being supplied. Accordingly, when the apparatus stops while showing the lighting pattern D, it can be determined that an abnormal point is at a transmission portion between the control board 202 and the display unit 11 or in the display unit 11. If the start-up of the information processing apparatus 1 is not completed as described above, the LAN controller 206 transmits a data packet representing this fact to an external apparatus and the control board CPU 203 turns on and off the LEDs 132 and 133 after (and also before) the transmission of this data packet.

The control board CPU 203 transmits image data to the LCD control circuit 214 in the display unit 11 (S116). The LCD control circuit 214 that has received the image data displays a screen on the LCD 212 on the basis of the received image data (S205).

From this point forward, if an abnormality is detected in the apparatus, the display of the abnormality is not performed using the LEDs 132 and 133 and information representing an abnormal point is displayed using the LCD 212 in the display unit 11.

The control board CPU 203 controls a reset control signal for the LAN controller 206 to set the reset control signal to a reset clearing state. The control board CPU 203 rewrites the setting value of a register in the LAN controller 206, which is used to determine, for example, the operation mode of the LAN controller 206, via a communication line to the LAN controller 206. The control board CPU 203 performs a setting via the communication line to the LAN controller 206 to start external network communication (S117).

The LAN controller 206, which has been set to be able to communicate with an external apparatus by the control board CPU 203, starts to communicate with an external network via the LAN connector 13 (S302).

Subsequently, the control board CPU 203 performs an LED control setting for the LAN controller 206 via a communication line (S118). The LAN controller 206, which has been set to be able to control the turning on and off of the LEDs 132 and 133 by the control board CPU 203, performs the lighting control of the LEDs 132 and 133 on the basis of a network communication status (operation status) (S303). The LAN controller 206 performs the lighting control of the LEDs 132 and 133 by outputting an LED control signal to the LAN LED driving circuit 208. Subsequently, the LAN controller 206 communicates with an external apparatus in response to an instruction made by the control board CPU 203.

From this point forward, the LAN controller 206 controls the turning on and off of the LEDs 132 and 133 on the basis of a network communication status and the control board CPU 203 does not control the turning on and off of the LEDs 132 and 133.

As described above, LEDs in the LAN connector 13 are used to display an abnormality (error). Since there is no need to provide an LED dedicated to the display of an abnormality, an abnormality display function is realized while achieving cost reduction.

The notification of a network communication status that is the original work of LEDs in the LAN connector 13 cannot be performed in a period from the turning on of the power switch 12 to the start of the display of the display unit 11, but can be performed after the display unit 11 has been ready to perform display processing at the time of the start of the apparatus.

By performing the above-described controls and using the above-described configuration, cost reduction can be achieved and an abnormal point can be notified to a user without a limitation to a function in an actual use even if an abnormality has occurred in a period from the turning on of the power switch 12 to the start of the display of the display unit 11. Accordingly, a correct recovery processing can be promoted.

Other Embodiments

The LEDs 132 and 133 are turned on and off on the basis of the execution status of a boot program in the above-described embodiment, but may be turned on and off on the basis of the status of the supply of a plurality of power sources in the information processing apparatus 1 at the time of start-up of the information processing apparatus 1. In the above-described embodiment, the power source board 201 includes a plurality of power sources for generating power of different voltages of DC 5 V for the control board 202 and DC 24 V for the display unit 11. The power source board 201 performs voltage generation using a plurality of power sources in a predetermined order such that the supply of a voltage is started in a predetermined order (for example, in order of increasing voltage) at the time of the start-up of the information processing apparatus 1. This is referred to as the start-up of power sources. In another embodiment, a circuit may be provided for monitoring a voltage generated by each power source and turning on and off an LED on the basis of the status of the supply of the voltage (that is, the start-up status of the power source).

The feature common to the above-described respective embodiments is that the LEDs 132 and 133 are turned on and off by the LAN controller 206 on the basis of a communication status and are also subjected to lighting control on the basis of the start-up status of the information processing apparatus 1.

In the above-described embodiments, the display unit 11 displays an image to notify a user or service person of information about an abnormal point. As a unit for making a notification about such information, a speaker may be used. For example, a speaker may make a sound notification about an abnormal point. After a communication unit has communicated with an external apparatus, a light-emitting unit can be turned on and off on the basis of the start-up status of an information processing apparatus.

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™) a flash memory device, a memory card, and the like.

While the present disclosure has been described with reference to exemplary embodiments, it is to be understood that the present disclosure is not limited to the particular disclosed exemplary embodiments. The scope of the following claims is to be accorded the broadest interpretation so as to encompass all such modifications and equivalent structures and functions.

This application claims the benefit of Japanese Patent Application No. 2019-056272, filed Mar. 25, 2019, which is hereby incorporated by reference herein in its entirety.

What is claimed is:

1. An information processing apparatus comprising:
    a display;
    a connector, to which a communication cable to communicate with an external apparatus is connectable;
    one or more light-emitters disposed to the connector;
    a communicator which communicates with the external apparatus via the connector;
    a first controller which controls indicating an execution status of a boot program by the one or more light-emitters; and
    a second controller which communicates with the external apparatus by the communicator and controls indicating a status of communication with the external apparatus by the communicator by the one or more light-emitters,
    wherein, in a case where an abnormality of a voltage supplied to the display is detected during execution of the boot program, the second controller communicates with the external apparatus, the second controller does not control indicating the status of communication with the external apparatus by the one or more light-emitters and the first controller indicating the execution status of the boot program by the one or more light-emitters.

2. The information processing apparatus according to claim 1, wherein the first controller controls indicating the execution status of the boot program before the communicator communicates with the external apparatus.

3. The information processing apparatus according to claim 1, wherein the communicator transmits a packet based on a start-up status of the information processing apparatus to the external apparatus.

4. The information processing apparatus according to claim 3, wherein the first controller generates the packet based on the start-up status of the information processing apparatus and causes the generated packet to be transmitted to the external apparatus.

5. The information processing apparatus according to claim 3, wherein the packet based on the start-up status of the information processing apparatus includes information about details of an error at a time of start-up of the information processing apparatus.

6. The information processing apparatus according to claim 1, wherein a start-up status of the information processing apparatus is a progress of processing for starting the information processing apparatus which is performed when a power source switch of the information processing apparatus is turned on.

7. The information processing apparatus according to claim 1, wherein the first controller executes the boot program for starting the information processing apparatus.

8. The information processing apparatus according to claim 7,
wherein the first controller includes a plurality of input/output ports used to communicate with another device, and
wherein the boot program includes setting processing of the input/output ports.

9. The information processing apparatus according to claim 8,
wherein the first controller includes a port used to communicate with the communicator and a port used to control turning on and off of the one or more light-emitters, and
wherein the first controller turns on and off the one or more light-emitters based on a start-up status of the information processing apparatus after setting processing of the ports has been performed and causes the communicator to communicate with the external apparatus without causing the second controller to turn on and off the one or more light-emitters.

10. The information processing apparatus according to claim 9, wherein the first controller causes the communicator to communicate with the external apparatus via the port used to communicate with the communicator.

11. The information processing apparatus according to claim 7,
wherein the boot program includes processing for supplying power to the display.

12. The information processing apparatus according to claim 7, wherein the boot program includes processing for setting the communicator to allow the communicator to communicate with the external apparatus.

13. The information processing apparatus according to claim 7, wherein the boot program causes the first controller to turn on and off the one or more light-emitters until the first controller performs predetermined processing in accordance with the boot program and sets the second controller so that the second controller can turn on and off the one or more light-emitters after the predetermined processing has been performed.

14. The information processing apparatus according to claim 13, wherein the predetermined processing is processing for receiving a signal indicating that start-up of the display unit has been completed from the display unit.

15. The information processing apparatus according to claim 7, wherein the second controller does not turn on or off the one or more light-emitters until the first controller executes the boot program to perform predetermined processing.

16. The information processing apparatus according to claim 1, wherein the boot program includes processing for displaying information on the display.

17. The information processing apparatus according to claim 1, wherein the boot program includes processing for setting the communicator to allow the second controller to turn on and off the one or more light-emitters.

18. The information processing apparatus according to claim 1, wherein each of the first controller and the second controller outputs a control signal for controlling turning on and off of the one or more light-emitters.

19. The information processing apparatus according to claim 18, wherein the one or more light-emitters is turned on when either of the first controller and the second controller has output a control signal for turning on the one or more light-emitters.

20. The information processing apparatus according to claim 1, wherein the first controller includes a central processing unit (CPU).

21. The information processing apparatus according to claim 1, wherein the one or more light-emitters includes two light-emitting diodes (LEDs).

22. The information processing apparatus according to claim 1, wherein the first controller controls turning on at least one of the one or more light-emitters in accordance with the execution status of the boot program.

23. The information processing apparatus according to claim 1, wherein the second controller controls turning on at least one of the one or more light-emitters in accordance with the status of communication with the external apparatus.

24. A control method for an information processing apparatus including a display and one or more light-emitters comprising;
executing a boot program;
controlling indicating an execution status of the boot program and one or more light-emitters;
communicating with an external apparatus after an execution of the boot program was completed; and
controlling indicating a status of communication with an external apparatus by the one or more light-emitters,
wherein, in a case where an abnormality of a voltage supplied to the display is detected during execution of the boot program, communicating with the external apparatus and controlling indicating the execution status of the boot program by the one or more light-emitters without controlling indicating the status of communication with the external apparatus by the one or more light-emitters.

* * * * *